(12) United States Patent
Liu et al.

(10) Patent No.: US 12,189,469 B2
(45) Date of Patent: Jan. 7, 2025

(54) PCIe DEVICE ERROR HANDLING SYSTEM

(71) Applicant: Dell Products L.P., Round Rock, TX (US)

(72) Inventors: Wei Liu, Austin, TX (US);
Tuyet-Huong Th Nguyen, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 18/298,470

(22) Filed: Apr. 11, 2023

(65) Prior Publication Data

US 2024/0345915 A1  Oct. 17, 2024

(51) Int. Cl.
*G06F 11/00* (2006.01)
*G06F 11/07* (2006.01)

(52) U.S. Cl.
CPC ...... *G06F 11/0793* (2013.01); *G06F 11/0745* (2013.01); *G06F 11/0787* (2013.01)

(58) Field of Classification Search
CPC ............. G06F 11/0745; G06F 11/0787; G06F 11/0793
See application file for complete search history.

(56) References Cited

U.S. PATENT DOCUMENTS

| | | | |
|---|---|---|---|
| 9,954,727 B2 | 4/2018 | Su et al. | |
| 11,366,710 B1* | 6/2022 | Hung | G06F 11/0751 |
| 2004/0003313 A1* | 1/2004 | Ramirez | G06F 11/0721 |
| | | | 714/6.24 |
| 2008/0126650 A1* | 5/2008 | Swanson | G06F 11/0721 |
| | | | 710/267 |
| 2019/0278651 A1* | 9/2019 | Thornley | G06F 11/0787 |
| 2020/0151048 A1* | 5/2020 | Shantamurthy | G06F 9/4806 |
| 2020/0285534 A1* | 9/2020 | Chaiken | G06F 11/0745 |
| 2021/0263868 A1* | 8/2021 | Maddukuri | G06F 11/0793 |
| 2022/0318087 A1* | 10/2022 | Hong | G06F 11/0793 |
| 2022/0374320 A1* | 11/2022 | Song | G06F 11/2028 |
| 2023/0195568 A1* | 6/2023 | Hong | G06F 11/073 |
| | | | 714/764 |
| 2024/0004757 A1* | 1/2024 | Lee | G06F 11/076 |
| 2024/0037283 A1* | 2/2024 | Chen | G06F 21/64 |
| 2024/0103961 A1* | 3/2024 | Wang | G06F 11/0793 |
| 2024/0176739 A1* | 5/2024 | Alden | G06F 11/1658 |

* cited by examiner

*Primary Examiner* — Joshua P Lottich
(74) *Attorney, Agent, or Firm* — Joseph Mencher

(57) ABSTRACT

A PCIe device error handling system includes a BIOS subsystem coupled to a PCIe device and a BMC device. The BIOS subsystem identifies an error in the PCIe device and, in response, begins an SMM that suspends the performance of at least one workload in an operating system, and generates and transmits a PCIe device error information collection instruction associated with the PCIe device to the BMC device. Subsequent to transmitting the PCIe device error information collection instruction, the BIOS subsystem ends the SMM such that the performance of at least one workload is resumed in the operating system. In response to receiving the PCIe device error information collection instruction from the BIOS subsystem, the BMC device retrieves PCIe device error information from the PCIe device while the operating system performs the at least one workload, and stores the PCIe device error information.

20 Claims, 7 Drawing Sheets

PCIe DEVICE ERROR HANDLING SYSTEM

BACKGROUND

The present disclosure relates generally to information handling systems, and more particularly to handling errors experienced by Peripheral Component Interconnect express (PCIe) devices included in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server devices, desktop computing devices, laptop/notebook computing devices, tablet computing devices, mobile phones, and/or other computing devices known in the art, include Peripheral Component Interconnect (PCIe) devices to, for example, add functionality to those computing devices. In some situations, PCIe devices in computing devices can experience errors that must be handled by the computing device. For example, errors occurring in a PCIe device included in a computing device are conventionally handled by a Basic Input/Output System (BIOS) in the computing device performing a System Management Interrupt (SMI) to begin a System Management Mode (SMM) that suspends operation of the processing system (e.g., a Central Processing Unit (CPU)) in the computing device in order to allow a BIOS SMI handler in the BIOS to collect information from the PCIe device experiencing the errors (e.g., often referred to as a "crash dump") for subsequent use in determining any cause(s) of those errors. However, such conventional PCIe device error handling techniques can raise issues.

For example, the collection of information from a PCIe device experiencing errors involves the BIOS SMI handler in the BIOS reading PCIe configuration space information from registers in that PCIe device and storing that PCIe configuration space information in a System Event Log (SEL). However, relatively time-consuming Input/Output (I/O) operations are required to perform such PCIe configuration space reads, and latency associated with the PCIe configuration space information reads while in the SMM discussed above can result in issues with the operating system including the dropping of network packets, the expiration of watchdog timers, and/or other OS SMM-based latency issues know in the art. As such, BIOS SMM-based Reliability Availability Serviceability (RAS) code that is configured to perform such PCIe configuration space information reads is designed to run in a relatively time-sensitive manner by capturing a relatively small set of PCIe configuration space information that is included in the registers in the PCIe device experiencing errors (e.g., "Bus:Device.Function" (BDF)/slot number information and Advanced Error Reporting (AER) information).

While such limited PCIe configuration space information reads reduce the latency during the SMM to address the associated latency issues with the operating system discussed above, the limited PCIe configuration space information read is often insufficient to determine any cause(s) of the errors being experienced by the PCIe device. For example, when a maximum payload size that is identified in the registers of the PCIe device experiencing errors (e.g., "MaxPayloadSize" (MPS) values) is not programmed uniformly across a PCIe path (e.g., from a root port on the processing system coupled to that PCIe device to an endpoint coupled to that PCIe device), a "malformed Transaction Layer Packet (TLP)" error may occur, and the limited PCIe configuration space information reads discussed above will not capture information needed to identify such non-uniform maximum payload sizes. Furthermore, the inventors of the present disclosure have recognized that a variety of other information that is associated with a PCIe device experiencing errors and that would be helpful in determining cause(s) of those errors is not captured by the limited PCIe configuration space information reads discussed above.

Accordingly, it would be desirable to provide a PCIe device error handling system that addresses the issues discussed above.

SUMMARY

According to one embodiment, an Information Handling System (IHS) includes a Basic Input/Output System (BIOS) processing system; a BIOS memory system that is coupled to the BIOS processing system and that includes instructions that, when executed by the BIOS processing system, cause the BIOS processing system to provide a BIOS engine that is configured to: identify an error in a Peripheral Component Interconnect express (PCIe) device that is coupled to the BIOS processing system and, in response, begin a System Management Mode (SMM) that suspends the performance of at least one workload in an operating system; generate and transmit a PCIe device error information collection instruction associated with the PCIe device; and end, subsequent to transmitting the PCIe device error information collection instruction, the SMM such that the performance of at least one workload is resumed in the operating system; a Baseboard Management Controller (BMC) processing system that is coupled to the BIOS processing system and the PCIe device; and a BMC memory system that is coupled to the BMC processing system and that includes instructions that, when executed by the BMC processing system, cause the BMC processing system to provide a BMC engine that is configured to: receive, from the BIOS engine, the PCIe device error information collection instruction and, in response, retrieve PCIe device error information from the PCIe device while the operating system performs the at least one workload; and store the PCIe device error information.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
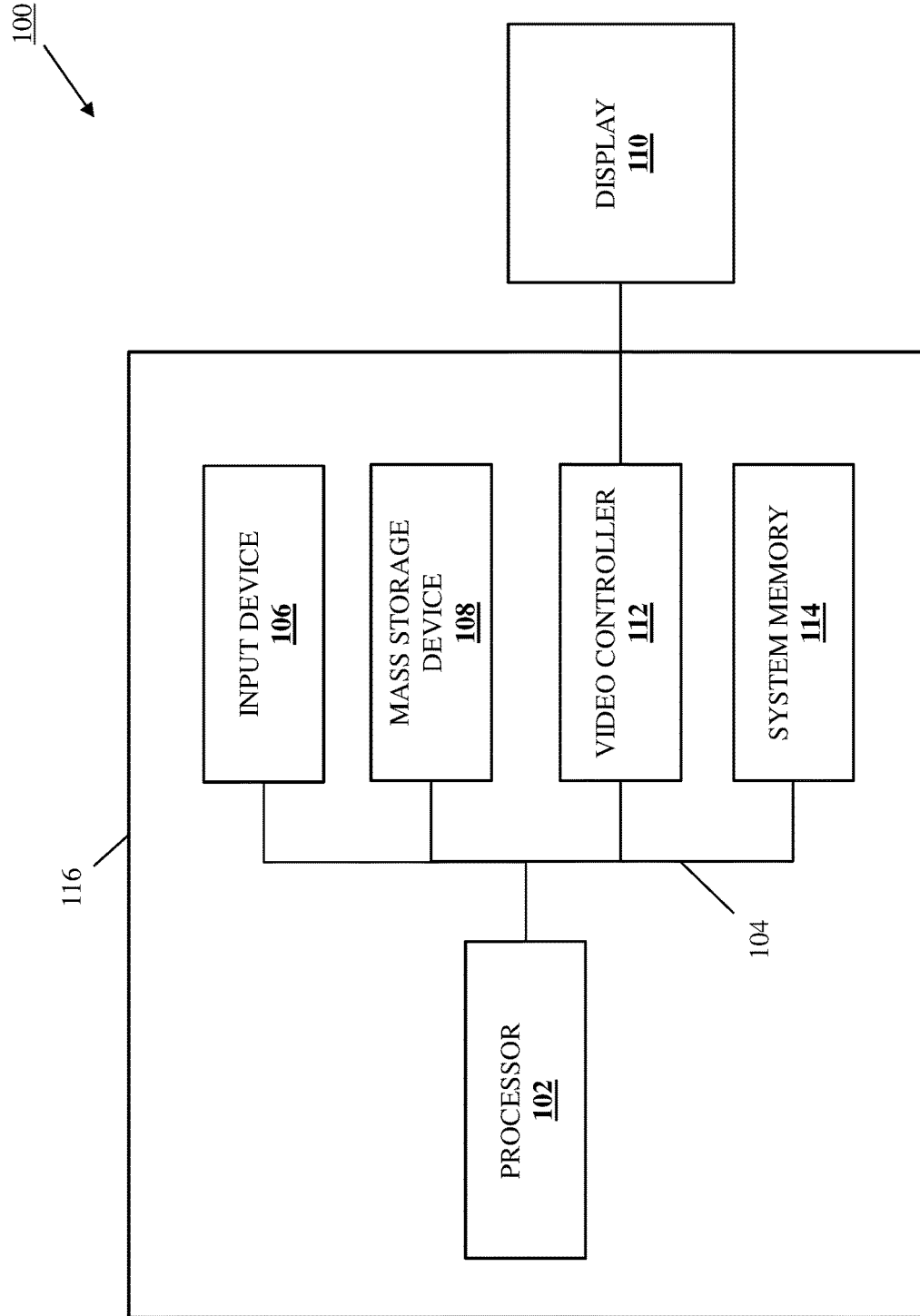
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
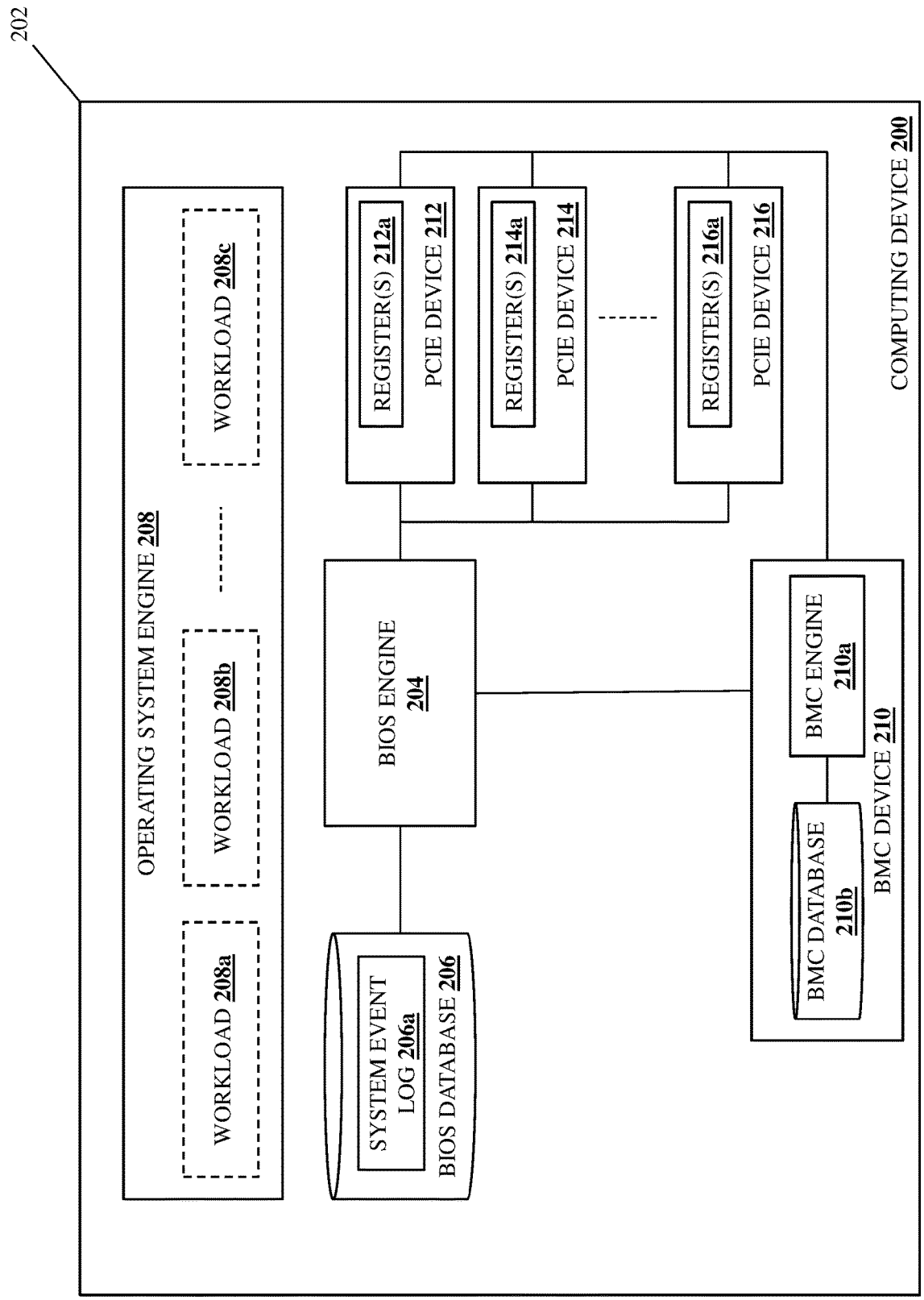
FIG. 2 is a schematic view illustrating an embodiment of a computing device that may include the PCIe device error handling system of the present disclosure.

Referring now to FIG. 2, an embodiment of a computing device 200 is illustrated that may include the PCIe device error handling system of the present disclosure. In an embodiment, the computing device 200 may be provided by the IHS 100 discussed above with reference to FIG. 1 and/or may include some or all of the components of the IHS 100, and in specific examples may be provided by server devices, desktop computing devices, laptop/notebook computing devices, tablet computing devices, mobile phones, and/or other computing devices known in the art. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and described below.

For example, the chassis 202 may house a Basic Input/Output System (BIOS) processing system (not illustrated, but which may include a processor similar to the processor 102 discussed above with reference to FIG. 1) and a BIOS memory system (not illustrated, but which may include a memory similar to the memory 114 discussed above with reference to FIG. 1) that is coupled to the BIOS processing system and that includes instructions that, when executed by the BIOS processing system, cause the BIOS processing system to provide a BIOS engine 204 that is configured to perform the functionality of the BIOS engines, BIOS subsystems, and/or computing devices discussed below. To provide a specific example, the BIOS engine 204 may be provided by BIOS firmware, although one of skill in the art in possession of the present disclosure will appreciate that the functionality of the BIOS engine 204 may be provided by other processing/memory system combinations while remaining within the scope of the present disclosure as well. Furthermore, while illustrated and described as a "BIOS" engine, one of skill in the art in possession of the present disclosure will appreciate how the BIOS engine 204 may be provided by a Unified Extensible Firmware Interface (UEFI) engine that may be provided to replace the BIOS engine 204 in the computing device 200 according to UEFI specifications that define an architecture of platform firmware used for booting and its interface for interaction with an operating system.

The chassis 202 may also house a BIOS storage system (not illustrated, but which may include a storage similar to the storage 108 discussed above with reference to FIG. 1) that is coupled to the BIOS engine 204 (e.g., via a coupling between the BIOS storage system and the BIOS processing system) and that includes a BIOS database 206 that is configured to store a System Event Log (SEL) 206a in the illustrated embodiment, and that one of skill in the art in possession of the present disclosure will appreciate may store any of the information utilized by the BIOS engine 204 discussed below. The chassis 202 may also house a central processing system (not illustrated, but which may include a Central Processing Unit (CPU) similar to the processor 102 discussed above with reference to FIG. 1) and a central memory system (not illustrated, but which may include a memory similar to the memory 114 discussed above with reference to FIG. 1) that is coupled to the central processing system and that includes instructions that, when executed by the central processing system, cause the central processing system to provide an operating system engine 208 that is configured to provide an operating system in the computing device 200 that provides for the performance of a plurality of workloads 208a, 208b, and up to 208c in the illustrated embodiment, and that one of skill in the art in possession of the present disclosure will appreciate may be configured to provide for the performance of any of the functionality of the operating system engines and/or computing devices discussed below.

The chassis 202 may also house a plurality of PCIe devices 212, 214, and up to 216 that are each coupled to the BIOS engine 204 (e.g., via coupling(s) between the PCIe devices 212-216 and the BIOS processing system discussed above) and that each include one or more registers 212a, 214a, and up to 216a, respectively, in the illustrated embodiment. However, while only illustrated as including registers, one of skill in the art in possession of the present disclosure will recognize PCIe devices may include a variety of PCIe components depending on the type of that PCIe device. For example, a Non-Volatile Memory express (NVMe) storage device that may provide any of the PCIe devices 214-216 may include processing systems, memory systems and storage system (either of which may include the queues discussed below), and/or other NVMe storage device components that would be apparent to one of skill in the art in possession of the present disclosure.

The chassis 202 may house a Baseboard Management Controller (BMC) device 210 that is coupled to the BIOS engine 204 (e.g., via a coupling between the BMC device 210 and the BIOS processing system discussed above) and each of the PCIe devices 212-216, and that may be provided by an integrated DELL® Remote Access Controller (iDRAC) included in server devices available from DELL® Inc. of Round Rock, Texas, United States, as well as any other BMC devices that would be apparent to one of skill in the art in possession of the present disclosure. In the illustrated embodiment, the BMC device 210 includes a BMC processing system (not illustrated, but which may include a processor similar to the processor 102 discussed above with reference to FIG. 1) and a BMC memory system (not illustrated, but which may include a memory similar to the memory 114 discussed above with reference to FIG. 1) that is coupled to the BMC processing system and that includes instructions that, when executed by the BMC processing system, cause the BMC processing system to provide a BMC engine 210a that is configured to perform the functionality of the BMC engines, BMC subsystems, and/or computing devices discussed below.

The BMC device 210 may also house a BMC storage system (not illustrated, but which may include a storage similar to the storage 108 discussed above with reference to FIG. 1) that is coupled to the BMC engine 210a (e.g., via a coupling between the BMC storage system and the BMC processing system) and that includes a BMC database 210b that is configured to store any of the information utilized by the BMC engine 210a discussed below. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the PCIe device error handling functionality discussed below, while remaining within the scope of the present disclosure as well.

Figure 3:
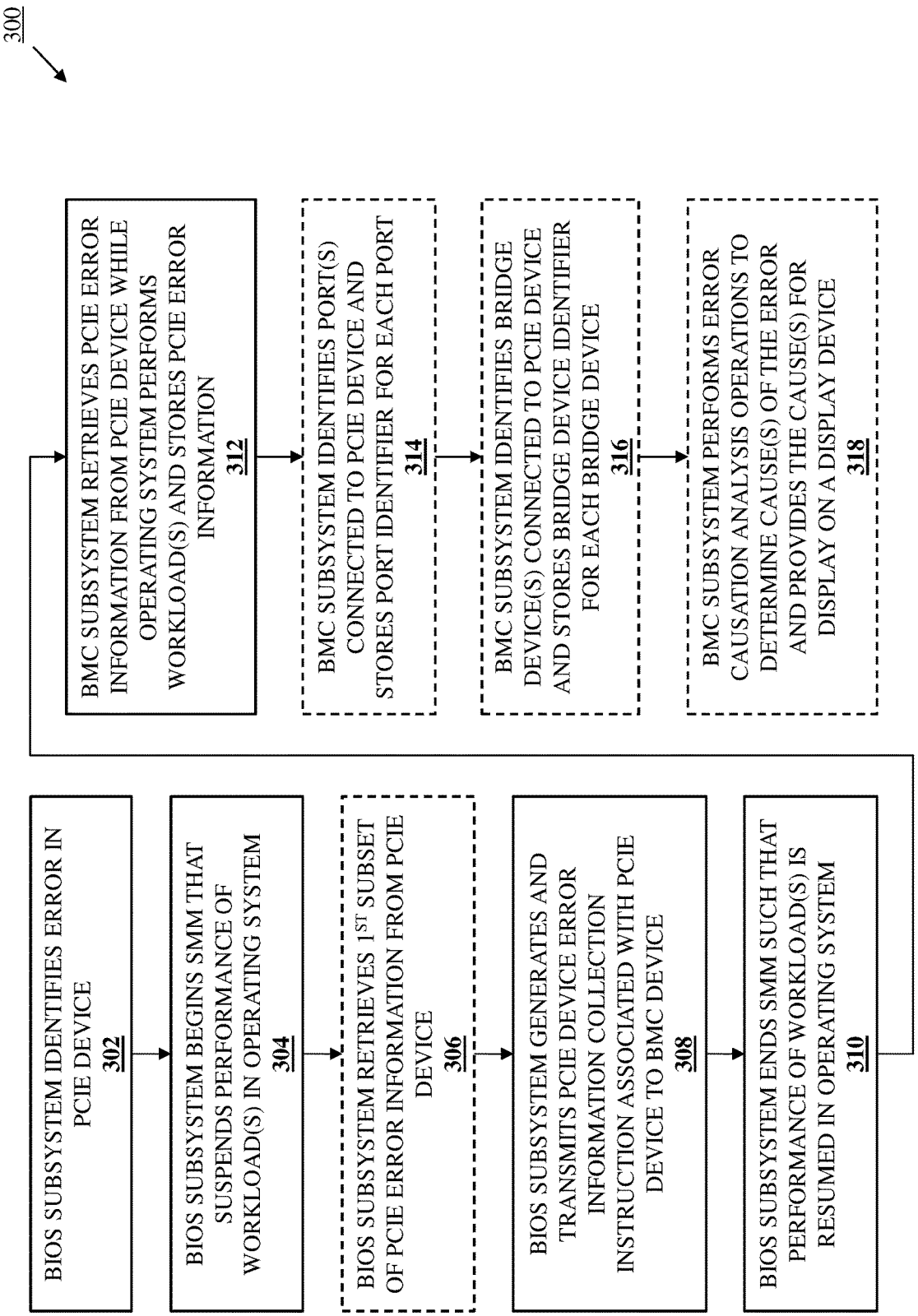
FIG. 3 is a flow chart illustrating an embodiment of a method for handling errors in a PCIe device.

Referring now to FIG. 3, an embodiment of a method 300 for handling errors in a PCIe device is illustrated. As discussed below, embodiments of the systems and methods of the present disclosure provide a BIOS subsystem that, in response to identifying an error in a PCIe device and beginning an SMM, instructs a BMC device to retrieve PCIe device error information and subsequently ends the SMM such that the BMC device may retrieve the PCIe device error information while an operating system performs one or more workloads. For example, the PCIe device error handling system of the present disclosure may include a BIOS subsystem coupled to a PCIe device and a BMC device. The BIOS subsystem identifies an error in the PCIe device and, in response, begins an SMM that suspends the performance of at least one workload in an operating system, and generates and transmits a PCIe device error information collection instruction associated with the PCIe device to the BMC device. Subsequent to transmitting the PCIe device error information collection instruction, the BIOS subsystem ends the SMM such that the performance of at least one workload is resumed in the operating system. In response to receiving the PCIe device error information collection instruction from the BIOS subsystem, the BMC device retrieves PCIe device error information from the PCIe device while the operating system performs the at least one workload, and stores the PCIe device error information. As such, a variety of PCIe device error information may be retrieved from a PCIe device that has experienced an error for use in determining cause(s) of that error without corresponding increases in latency of operating system workload performance.

Figure 4:
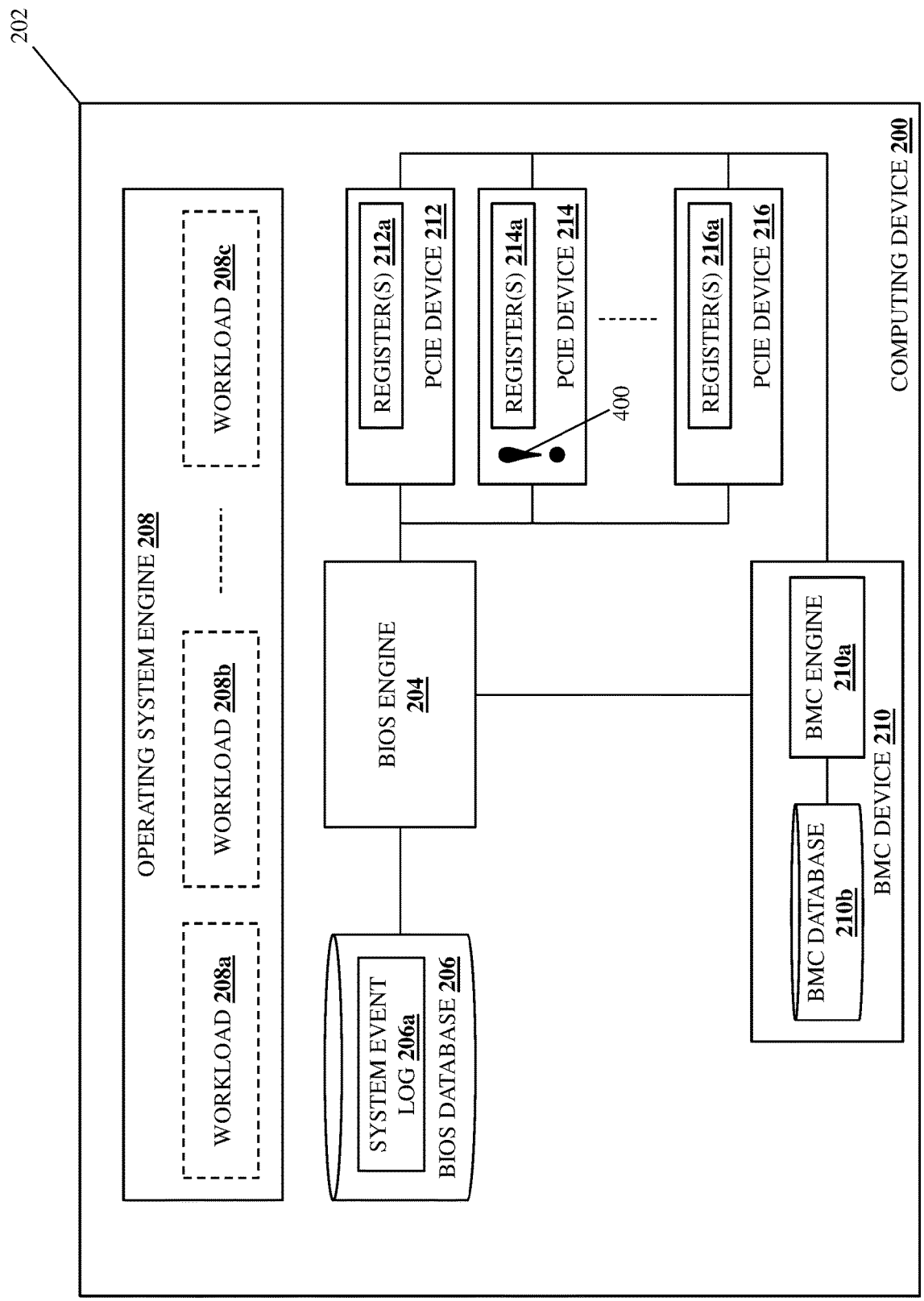
FIG. 4 is a schematic view illustrating an embodiment of the computing device of FIG. 2 operating during the method of FIG. 3.

The method 300 begins at block 302 where a BIOS subsystem identifies an error in a PCIe device. With reference to FIG. 4, in an embodiment of block 302, the PCIe device 214 in the computing device 200 may experience an error (e.g., as indicated by element 400 in FIG. 4) that may include any of a variety of correctable or uncorrectable PCIe device errors that would be apparent to one of skill in the art in possession of the present disclosure. In response to the PCIe device 214 experiencing the error at block 302, the BIOS engine 204 in the computing device 200 may identify that error using any of a variety of PCIe device error identification techniques that would be apparent to one of skill in the art in possession of the present disclosure. As will be appreciated by one of skill in the art in possession of the present disclosure, in the embodiments discussed below, the computing device 200 (e.g., a chipset in the computing device 200) may have previously been provided (e.g., by default, by a network administrator or other user of the computing device 200, etc.) with an "SMM-first" error handling configuration that will cause the BIOS SMM error handling operations discussed below to be performed by the BIOS engine 204 in response to PCIe device errors rather than having those errors handled by the operating system engine 208 (e.g., via an "OS-first" error handling configuration). However, as also discussed below, some embodiments of the present disclosure may configure the BMC device 210 to offload PCIe device errors (e.g., the correctable PCIe device errors discussed above) from the BIOS engine 204 while remaining within the scope of the present disclosure as well.

The method 300 then proceeds to block 304 where the BIOS subsystem begins a SMM that suspends performance of one or more workloads in an operating system. In an embodiment, at block 304 and in response to identifying the error in the PCIe device 214, the BIOS engine 204 in the computing device 200 may perform a System Management Interrupt (SMI) to begin a System Management Mode (SMM) that one of skill in the art in possession of the present disclosure will appreciate may suspend performance of any or all of the workload(s) 208a-208c being performed in the operating system provided by the operating system engine 208. For example, the SMM may be provided by an operating mode of an x86 CPU that provides the operating system engine 208, with that operating mode suspending the operating system and other "normal" execution operations in the computing device 200 so that an alternate software system (e.g., the BIOS engine 204 provided by BIOS firmware in the embodiments described herein, a hardware-assisted debugging subsystem, etc.) may be executed with relatively high privileges. However, while a few specific examples of the SMM are described, one of skill in the art in possession of the present disclosure will appreciate how other SMM functionality will fall within the scope of the present disclosure as well.

Figure 5:
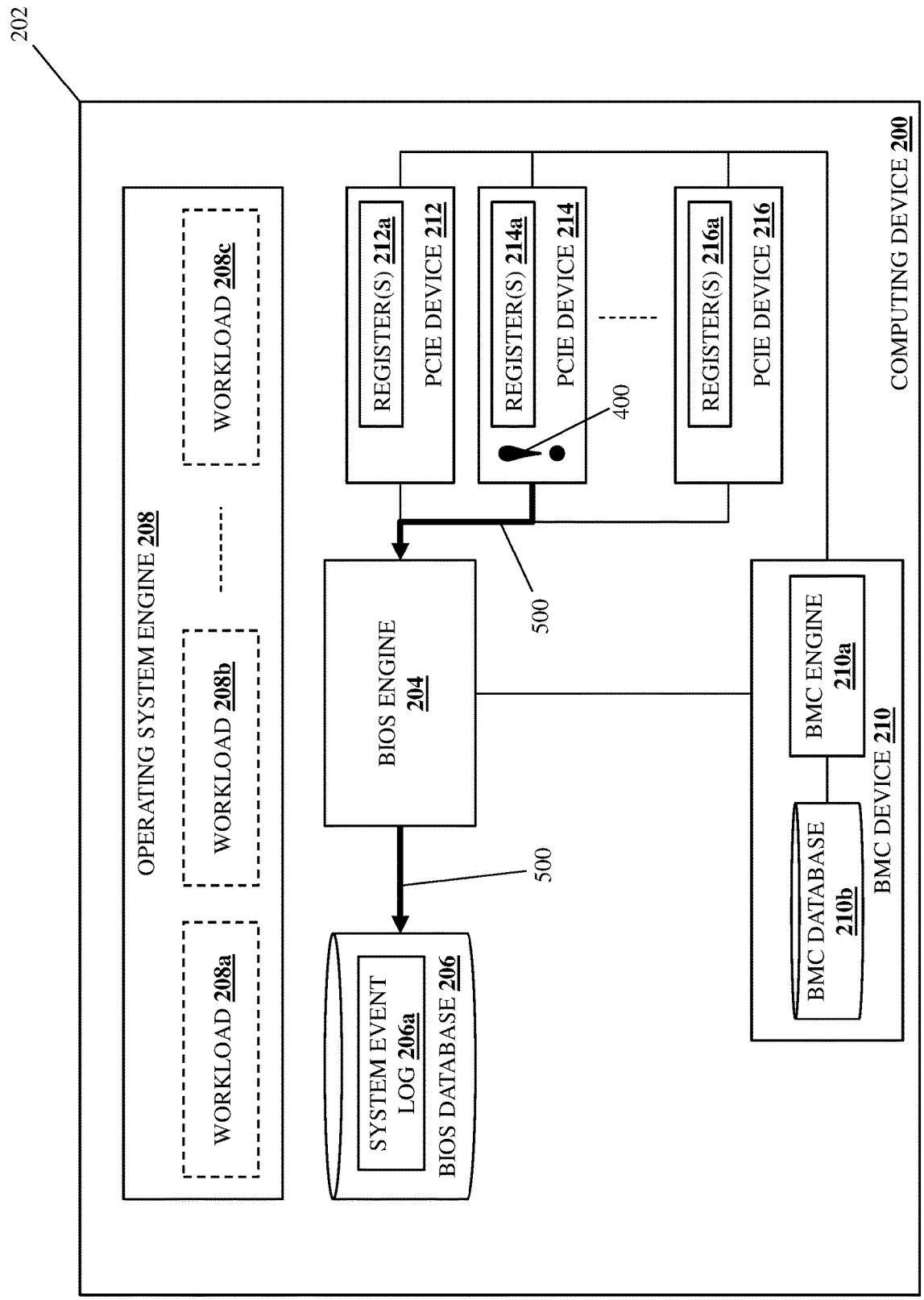
FIG. 5 is a schematic view illustrating an embodiment of the computing device of FIG. 2 operating during the method of FIG. 3.

The method 300 may then proceed to optional block 306 where the BIOS subsystem may retrieve a first subset of PCIe device error information from the PCIe device. With reference to FIG. 5, in some embodiments and at optional block 306, the BIOS engine 204 may perform PCIe device error information retrieval operations 500 that may include retrieving a subset of PCIe device error information associated with the PCIe device 214 from the register(s) 214a in the PCIe device 214, and storing that subset of PCIe device error information in the System Event Log (SEL) 206a in the BIOS database 206. As will be appreciated by one of skill in the art in possession of the present disclosure, optional block 306 of the method 300 may provide for the conventional performance of PCIe error handling operations discussed above by the BIOS engine 204 to collect a first subset of PCI device error information from the register(s) 214a in the PCIe device 214.

As such, in some embodiments of optional block 306, a BIOS SMI handler provided by the BIOS engine 204 may read PCIe configuration space information from register(s) 214a in the PCIe device 214 and store that PCIe configuration space information in the SEL 206a in the BIOS database 206, with BIOS SMM-based RAS code executed by the BIOS SMI handler capturing a relatively small set of the PCIe configuration space information that is included in the register(s) 214a in the PCIe device 214 such as the "Bus: Device. Function" (BDF)/slot number information and Advanced Error Reporting (AER) information associated with the PCIe device 214. However, while optional block 306 describes the capture of a first subset of PCIe device error information by the BIOS engine 204, one of skill in the art in possession of the present disclosure will appreciate how the BIOS engine 204 need not collect PCIe device error information in some embodiments of the method 300, and thus optional block 306 may be skipped (e.g., to reduce the operating system workload performance latency associated with entering the SMM by the BIOS engine 204).

Figure 6:
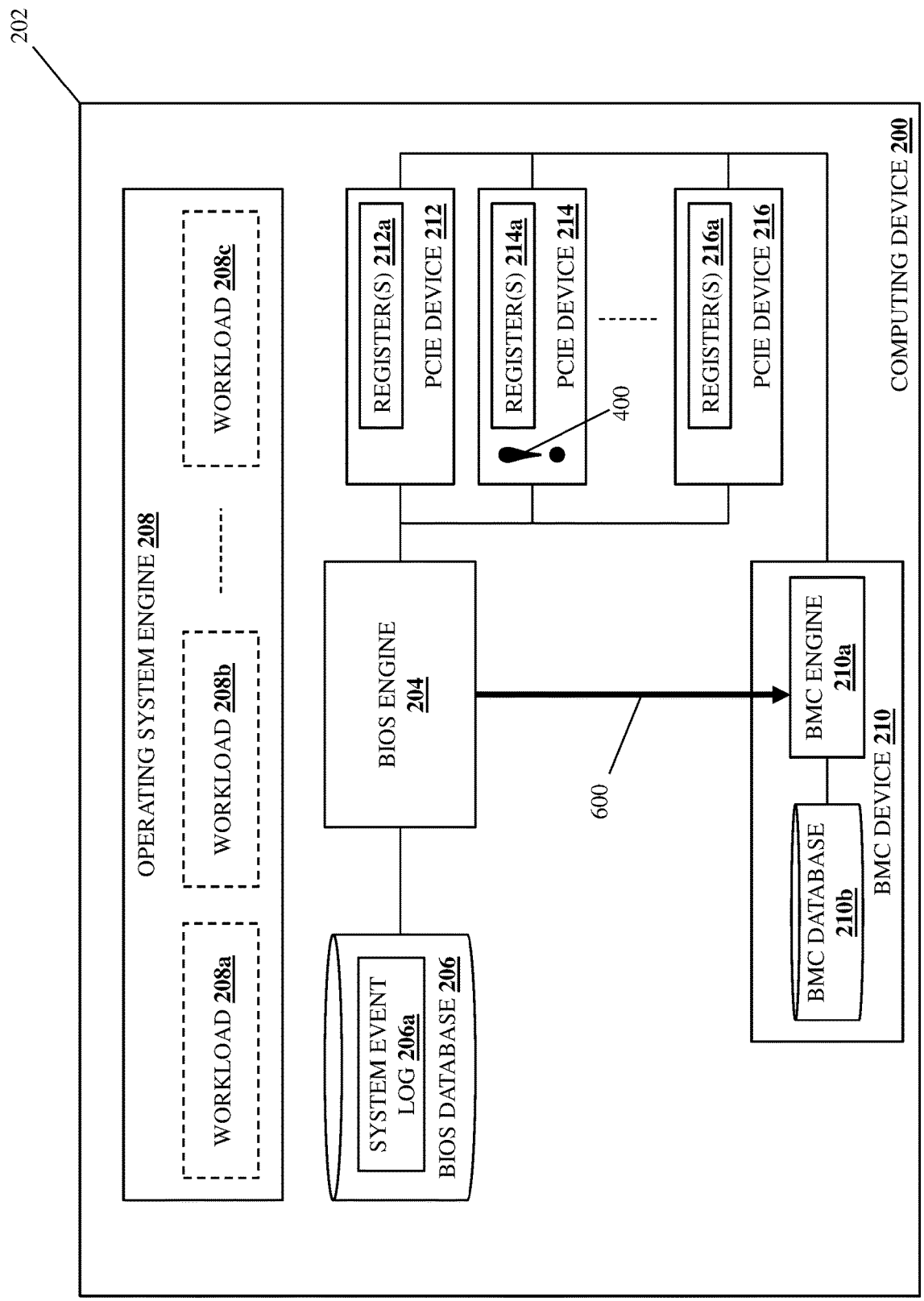
FIG. 6 is a schematic view illustrating an embodiment of the computing device of FIG. 2 operating during the method of FIG. 3.

The method 300 then proceeds to block 308 where the BIOS subsystem generates and transmits a PCIe device error information collection instruction associated with the PCIe device to a BMC device. With reference to FIG. 6, in an embodiment of block 308 and in response to identifying the error in the PCIe device 214 (and, in some embodiments, retrieving the first subset of PCIe device error information), the BIOS engine 204 in the computing device 200 may perform PCIe device error information collection instruction transmission operations 600 that may include generating a PCIe device error information collection instruction and transmitting that PCIe device error information collection instruction to the BMC device 210 such that it is received by the BMC engine 210a. For example, at block 308 the BIOS engine 204 may generate an Intelligent Platform Management Interface (IPMI) command that provides the PCIe device error information collection instruction and that may include BDF information for the PCIe device 214, Fully Qualified Device Descriptor (FQDD) information for the PCIe device 214, and/or any other identifying information for the PCIe device 214 that would be apparent to one of skill in the art in possession of the present disclosure, and may transmit that IMPI command to the BMC engine 210a in the BMC device 210. However, while a specific example of instructing the BMC device 210 to retrieve PCIe device error information has been described, one of skill in the art in possession of the present disclosure will appreciate how the BMC device 210 may be instructed to retrieve PCIe device error information from the PCIe device 214 using variety of other techniques that will fall within the scope of the present disclosure as well.

The method 300 then proceeds to block 310 where the BIOS subsystem ends the SMM such that the performance of the one or more workloads is resumed in the operating system. In an embodiment, at block 310 and subsequent to instructing the BMC device 210 to retrieve the PCIe device error information, the BIOS engine 204 in the computing device 200 may end the SMM that was begun at block 304 such that the operating system engine 208 may resume performance of the one or more workloads 208a-208c that were suspended in response to beginning the SMM. For example, at block 310, the BIOS SMI handler provided by the BIOS engine 204 may exit the SMM and control may be passed back to an operating system provided by the operating system engine 208. However, while the method 300 is described as including the operating system provided by the operating system engine 208 resuming the performance of the workload(s) 208a-208c, one of skill in the art in possession of the present disclosure will appreciate that the operating system provided by the operating system engine 208 may recover or "crash" following the error with the PCIe device 214 depending on the type of that error (e.g., correctable errors may be corrected, uncorrectable errors may be recovered from by disabling the PCIe device 214, uncorrectable errors may result in a "crash" of the computing device 200, etc.).

As discussed above, some embodiments of the present disclosure may include the BIOS engine 204 performing PCIe device error handling operations during the SMM that may include retrieving the limited PCIe configuration space information from the register(s) 214a in the PCIe device 214 that provides the first subset of PCIe device error information at optional block 306. Furthermore, one of skill in the art in possession of the present disclosure will appreciate how the BIOS engine 204 may perform other PCIe device error handling operations during the SMM (e.g., in addition to retrieving the first subset of PCIe device error information, without retrieving the first subset of PCIe device error information, etc.) such as, for example, causing the error in the PCIe device 214 to be logged (e.g., generating and transmitting a error logging command to any error logging subsystem in the computing device 200), reading and recording any registers included in components in the computing device 200, and/or any other PCIe device error handling operations that one of skill in the art in possession of the present disclosure will appreciate would not substantially increase the operating system workload performance latency discussed above.

Furthermore, while the BIOS engine 204 is described herein as beginning the SMM at block 304, instructing the BMC device 210 to retrieve PCIe device error information at block 308, and ending the SMM at block 310, some embodiments of the present disclosure may omit PCIe device error handling operations by the BIOS engine 204 and eliminate the need to enter the SMM in response to errors in any of the PCIe devices 212-216. For example, future BMC device/PCIe device/computing device implementations may allow PCIe error handling operations to be "offloaded" from the BIOS engine 204 by the BMC device 210 such that the BMC device 210 may be configured to identify an error in a PCIe device (e.g., similarly as performed by the BIOS engine 204 as described with reference to block 302 above), and then perform the PCIe device error handling operations described below without the need for the computing device 200 to enter the SMM that suspends performance of the workloads 208a-208c in the operating system provided by the operating system engine 208. As will be appreciated by one of skill in the art in possession of the present disclosure, in such embodiments, the BMC device 210 may be configured to handle correctable errors in PCIe devices without involvement of the BIOS engine 204, while uncorrectable errors in PCIe devices may involve the BIOS engine 204 due to, for example, the BIOS engine 204 being capable of providing for the recovery of the computing device 200 from such "uncorrectable" errors (e.g., by disabling the PCIe device experiencing that uncorrectable error).

Figure 7:
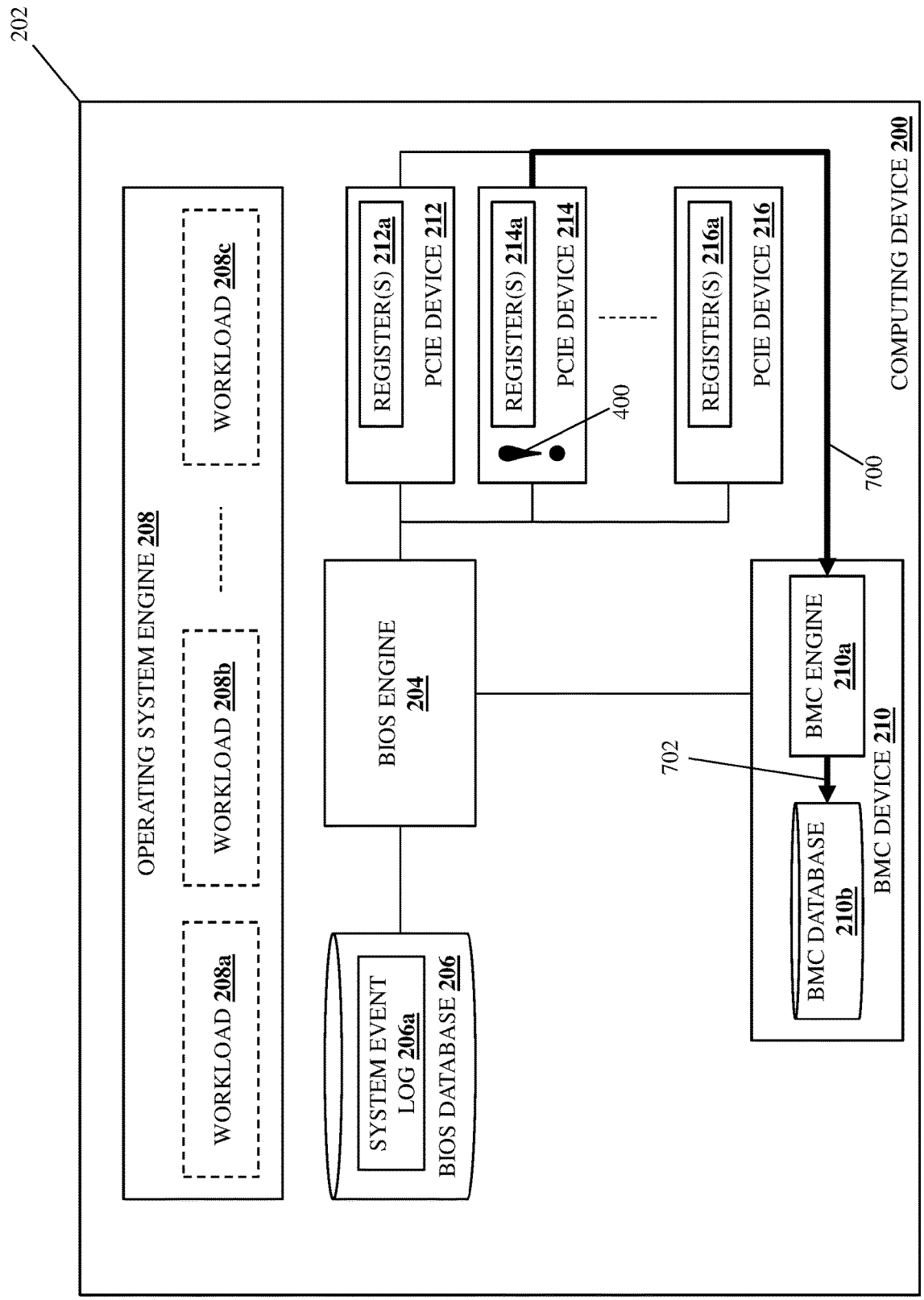
FIG. 7 is a schematic view illustrating an embodiment of the computing device of FIG. 2 operating during the method of FIG. 3.

The method 300 then proceeds to block 312 where the BMC subsystem retrieves PCIe device error information from the PCIe device while the operating system performs the one or more workloads and stores the PCIe device error information. With reference to FIG. 7, in an embodiment of block 312 and in response to receiving the PCIe device error information collection instruction at block 308, the BMC engine 210a in the BMC device 210 may perform PCIe device error information retrieval operations 700 that include retrieving PCIe device error information from the PCIe device 214, followed by the performance of PCIe device error information storage operations 702 that include storing PCIe error information in the BMC database 210b (e.g., often referred to as a "crash dump"). For example, at block 312, the PCIe device error information retrieval operations 700 may include retrieving PCIe device error information from any of the register(s) 214a in the PCIe device 214, while the PCIe device error information storage operations 702 may include storing that PCIe device error information in a Trouble Shooting Record (TSR) in the BMC database 210b, and one of skill in the art in possession of the present disclosure will appreciate how the PCIe device error information retrieval operations 700 and the PCIe device error information storage operations 702 may be performed "Out-Of-Band" (OOB) and/or otherwise without the operating system being aware of those operations, and while the workload(s) 208a-208c are performed in the operating system.

For example, in embodiments in which optional block 306 of the method 300 is performed such that the BIOS engine 204 in the computing device 200 retrieves the first subset of the PCIe device error information from the register(s) 214a in the PCIe device 214, at block 312 the BMC engine 210a in the BMC device 210 may retrieve a second subset of the PCIe device error information from the register(s) 214a in the PCIe device 214 that is different from the first subset of the PCIe device error information. To provide a specific example, the second subset of the PCIe device error information retrieved at block 312 may include Base Address Register (BAR) information, command (CMD) register information, status register information that is included in the register(s) 214a in the PCIe device 214, and/or any other PCIe device error information that one of skill in the art in possession of the present disclosure will appreciate is not conventionally retrieved by a BIOS during conventional PCIe device error handling operations.

In another specific example, the second subset of the PCIe device error information retrieved at block 312 may include maximum payload size information that is identified in the register(s) 214a of the PCIe device 214 (e.g., "MaxPayloadSize" (MPS) values) and that, as discussed above, is not conventionally retrieved by a BIOS during conventional PCIe device error handling operations. However, while a few specific examples of the second subset of PCIe device error information are provided, one of skill in the art in possession of the present disclosure will appreciate how a variety of PCIe device error information that is not retrieved by a BIOS during conventional PCIe device error handling operations may be helpful in determining cause(s) of the error in the PCIe device 214, and thus may be retrieved by the BMC engine 210a/BMC device 210 at block 312 while remaining within the scope of the present disclosure as well. Furthermore, while the embodiments in which optional block 306 are performed are described as having the BIOS engine 204 and the BMC engine 210a retrieve different subsets of PCIe device error information, one of skill in the art in possession of the present disclosure will appreciate how the retrieval of the same/"overlapping" PCIe device error information by the BIOS engine 204 and BMC engine 210a will fall within the scope of the present disclosure as well.

In another example, in embodiments in which optional block 306 of the method 300 is not performed such that the BIOS engine 204 in the computing device 200 does not retrieve the first subset of the PCIe device error information from the register(s) 214a in the PCIe device 214, at block 312 the BMC engine 210a in the BMC device 210 may retrieve any of the PCIe device error information discussed above from the register(s) 214a in the PCIe device 214. As such, the PCIe device error information retrieved at block 312 in such embodiments may include the BDF/slot number information, AER information, BAR information, CMD register information, status register information, and/or maximum payload size information discussed above, as well as any other PCIe device error information that one of skill in the art in possession of the present disclosure would recognize as being helpful in determining cause(s) of the error in the PCIe device 214. However, while a variety of specific examples of the retrieval of PCIe device error information from register(s) in a PCIe device have been described, one of skill in the art in possession of the present disclosure will appreciate how any PCIe device error information may be retrieved at block 312 while remaining within the scope of the present disclosure as well.

The method 300 may then proceed to optional block 314 where the BMC subsystem may identify one or more ports that are connected to the PCIe device and stores port identifiers for each port. With reference back to FIG. 7, in an embodiment of optional block 314, the PCIe device error information retrieval operations 700 may include retrieving PCIe device information from any of the register(s) 214a in the PCIe device 214 and using that PCIe device information to identify PCIe device error information that includes port identifiers for one or more ports that are connected to the PCIe device 214, while the PCIe device error information storage operations 702 may include storing that PCIe device error information/port identifiers in a TSR in the BMC database 210*b*, and one of skill in the art in possession of the present disclosure will appreciate how the PCIe device error information retrieval operations 700 and the PCIe device error information storage operations 702 may be performed "Out-Of-Band" (OOB) and/or otherwise without the operating system being aware of those operations, and while the workload(s) 208*a*-208*c* are performed in the operating system.

For example, the PCIe device information retrieved from the register(s) 214*a* in the PCIe device 214 during the PCIe device error information retrieval operations 700 may include the BDF/slot number information discussed above. As will be appreciated by one of skill in the art in possession of the present disclosure, the BMC device 210 may include a PCIe device registry (e.g., in the BMC database 210*b*) that identifies the PCIe devices 212-216 and any ports connected to those PCIe devices 212-216, and the BMC engine 210*a* in the BMC device 210 may use BDF/slot number information retrieved from the PCIe device 214 along with that PCIe device registry to identify the PCIe device error information that includes the port identifiers for one or more root ports on a processing system in the computing device 200 (e.g., the CPU discussed above) that are connected to the PCIe device 214, as well as any other ports on any other devices that are connected to the PCIe device 214.

In a specific example, the BMC engine 210*a* in the BMC device 210 may identify root port(s) on a processing system in the computing device 200 that are connected to the PCIe device 214 using the BDF/slot number information and via Platform Environment Control Interface (PECI) commands (e.g., when the computing device 200 includes a processing system provided by INTEL® corporation of Santa Clara, California, United States) or via Advanced Platform Management Link (APML) commands (e.g., when the computing device 200 includes a processing system provided by AMD® Inc. of Santa Clara, California, United States). However, while specific examples of the identification of ports connected to the PCIe device 214 have been described, one of skill in the art in possession of the present disclosure will appreciate how ports connected to a PCIe device may be identified in a variety of manners while remaining within the scope of the present disclosure as well.

The method 300 may then proceed to optional block 316 where the BMC subsystem may identify one or more bridge devices that are connected to the PCIe device and stores bridge device identifiers for each bridge device. With reference back to FIG. 7, in an embodiment of optional block 316, the PCIe device error information retrieval operations 700 may include retrieving PCIe device information from any of the register(s) 214*a* in the PCIe device 214 and using that PCIe device information to identify PCIe device error information that includes bridge device identifiers for one or more bridge device that are connected to the PCIe device 214, while the PCIe device error information storage operations 702 may include storing that PCIe device error information/bridge device identifiers in a TSR in the BMC database 210*b*, and one of skill in the art in possession of the present disclosure will appreciate how the PCIe device error information retrieval operations 700 and the PCIe device error information storage operations 702 may be performed "Out-Of-Band" (OOB) and/or otherwise without the operating system being aware of those operations, and while the workload(s) 208*a*-208*c* are performed in the operating system.

Similarly as discussed above, the PCIe device information retrieved from the register(s) 214*a* in the PCIe device 214 during the PCIe device error information retrieval operations 700 may include the BDF/slot number information discussed above, and the BMC device 210 may include a PCIe device registry (e.g., in the BMC database 210*b*) that identifies the PCIe devices 212-216 and any bridge devices connected to those PCIe devices 212-216. As such, the BMC engine 210*a* in the BMC device 210 may use BDF/slot number information retrieved from the PCIe device 214 along with that PCIe device registry to identify the PCIe device error information that includes the bridge device identifiers for one or more bridge devices in the computing device 200 that are connected to the PCIe device 214. However, while specific examples of the identification of bridge devices connected to the PCIe device 214 have been described, one of skill in the art in possession of the present disclosure will appreciate how bridge devices connected to a PCIe device may be identified in a variety of manners while remaining within the scope of the present disclosure as well.

Furthermore, while the retrieval of PCIe device error information from the register(s) 214*a* in the PCIe device 214, as well as the identification of PCIe device error information including port(s) and bridge device(s) connected to the PCIe device 214, has been described as being performed by the BMC engine 210*a*/BMC device 210, one of skill in the art in possession of the present disclosure will appreciate how the BMC engine 210*a*/BMC device 210 may retrieve any information from any components included in and/or coupled to the PCIe device 214 for use in determining the cause(s) of the error in that PCIe device 214 while remaining within the scope of the present disclosure. For example, in embodiments in which the PCIe device 214 is provided by a Non-Volatile Memory express (NVMe) storage device, the PCIe device error information may be retrieved from a queue (e.g., a command queue) included in that NVMe storage device. As such, any PCIe device error information generated from the error experienced by the PCIe device 214 and/or any PCIe device error information related to the context of the error experienced by the PCIe device 214 is envisioned as falling within the scope of the present disclosure.

The method 300 may then proceed to optional block 318 where the BMC subsystem may perform error causation analysis operations to determine one or more causes of the error and provide the one or more causes for display on a display device. In an embodiment, at optional block 318, the BMC engine 210*a* in the BMC device 210 may utilize any of the PCIe device error information retrieved and/or identified during the method 300 to perform error causation analysis operations that determine one or more causes of the error experienced by the PCIe device 214 (e.g., during development of the computing device 200, during deployment of the computing device 200, etc.). As such, in embodiments in which optional block 306 is performed, the BMC engine 210*a* may access the first subset of PCIe device error information that was retrieved by the BIOS engine 204 from PCIe device 214 at optional block 306, the second subset of PCIe device error information it retrieved from the PCIe device 214 at block 312, the PCIe device error information including the port(s) it identified at optional block 314, and/or the PCIe device error information including the bridge device(s) it identified at optional block 316, and use any of that PCIe device error information in the performance of error causation analysis operations to determine cause(s) of the error experienced by the PCIe device 214. The BMC engine 210*a* in the BMC device 310 may then provide those cause(s) of the of the error experienced by the PCIe device 214 for display on a display device coupled to the computing device 200 (e.g., the display 110 discussed above with reference to FIG. 1, a display on a management device coupled to the computing device 200, etc.)

Similarly, in embodiments in which optional block 306 is not performed, the BMC engine 210*a* may access the PCIe device error information it retrieved from the PCIe device 214 at block 312, the PCIe device error information including the port(s) it identified at optional block 314, and/or the PCIe device error information including the bridge device(s) it identified at optional block 316, and use any of that PCIe device error information in the performance of error causation analysis operations to determine cause(s) of the error experienced by the PCIe device 214. The BMC engine 210*a* in the BMC device 310 may then provide those cause(s) of the of the error experienced by the PCIe device 214 for display on a display device coupled to the computing device 200 (e.g., the display 110 discussed above with reference to FIG. 1, a display on a management device coupled to the computing device 200, etc.). Furthermore, while the BMC engine 210*a* in the BMC device 210 is described as performing the error causation analysis operations, one of skill in the art in possession of the present disclosure will appreciate how an error causation analysis device that is separate from the BMC device 210 may perform the error causation analysis operations discussed above (e.g., via retrieval of the PCIe device error information discussed above, in response to receiving the PCIe device error information from the BMC device 210, etc.) while remaining within the scope of the present disclosure as well.

Thus, systems and methods have been described that provide a BIOS subsystem that, in response to identifying an error in a PCIe device and beginning an SMM, instructs a BMC device to retrieve PCIe device error information and subsequently ends the SMM such that the BMC device may retrieve the PCIe device error information while an operating system performs one or more workloads. For example, the PCIe device error handling system of the present disclosure may include a BIOS subsystem coupled to a PCIe device and a BMC device. The BIOS subsystem identifies an error in the PCIe device and, in response, begins an SMM that suspends the performance of at least one workload in an operating system, and generates and transmits a PCIe device error information collection instruction associated with the PCIe device to the BMC device. Subsequent to transmitting the PCIe device error information collection instruction, the BIOS subsystem ends the SMM such that the performance of at least one workload is resumed in the operating system. In response to receiving the PCIe device error information collection instruction from the BIOS subsystem, the BMC device retrieves PCIe device error information from the PCIe device while the operating system performs the at least one workload, and stores the PCIe device error information. As such, a variety of PCIe device error information may be retrieved from a PCIe device that has experienced an error for use in determining cause(s) of that error without corresponding increases in latency of operating system workload performance.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Peripheral Component Interconnect express (PCIe) device error handling system, comprising:
   an operating system;
   a Peripheral Component Interconnect express (PCIe) device;
   a Basic Input/Output System (BIOS) subsystem that is coupled to the PCIe device and that is configured to:
     identify an error in the PCIe device and, in response, begin a System Management Mode (SMM) that suspends the performance of at least one workload in the operating system;
     generate and transmit a PCIe device error information collection instruction associated with the PCIe device; and
     end, subsequent to transmitting the PCIe device error information collection instruction, the SMM such that the performance of at least one workload is resumed in the operating system; and
   a Baseboard Management Controller (BMC) device that is coupled to the BIOS and that is configured to:
     receive, from the BIOS subsystem, the PCIe device error information collection instruction and, in response, retrieve PCIe device error information from the PCIe device while the operating system performs the at least one workload; and
     store the PCIe device error information.

2. The system of claim 1, wherein the PCIe device error information retrieved by the BMC device includes a first subset of PCIe device error information that is included in at least one register in the PCIe device, and wherein the BIOS subsystem is configured to:
   retrieve, in response to identifying the error in the PCIe device, a second subset of the PCIe device error information that is included in at least one register in the PCIe device and that is different than the first subset of the PCIe device error information; and
   store the second subset of the PCIe device error information.

3. The system of claim 1, wherein the BMC device is configured to:
   identify, in response to receiving the PCIe device error information collection instruction, at least one port that is connected to the PCIe device; and
   store a port identifier for each of the at least one port.

4. The system of claim 1, wherein the BMC device is configured to:
   identify, in response to receiving the PCIe device error information collection instruction, at least one bridge device that is connected to the PCIe device; and
   store a bridge device identifier for each of the at least one bridge device.

5. The system of claim 1, wherein the PCIe device is a Non-Volatile Memory express (NVMe) storage device and the PCIe device error information is retrieved from a queue included in the NVMe storage device.

6. The system of claim 1, wherein the BMC device is configured to:
   perform error causation analysis operations using the PCIe device error information to determine at least one cause of the error identified in the PCIe device; and
   provide the at least one cause of the error identified in the PCIe device for display on a display device.

7. An Information Handling System (IHS), comprising:
a Basic Input/Output System (BIOS) processing system;
a BIOS memory system that is coupled to the BIOS processing system and that includes instructions that, when executed by the BIOS processing system, cause the BIOS processing system to provide a BIOS engine that is configured to:
  identify an error in a Peripheral Component Interconnect express (PCIe) device that is coupled to the BIOS processing system and, in response, begin a System Management Mode (SMM) that suspends the performance of at least one workload in an operating system;
  generate and transmit a PCIe device error information collection instruction associated with the PCIe device; and
  end, subsequent to transmitting the PCIe device error information collection instruction, the SMM such that the performance of at least one workload is resumed in the operating system;
a Baseboard Management Controller (BMC) processing system that is coupled to the BIOS processing system and the PCIe device; and
a BMC memory system that is coupled to the BMC processing system and that includes instructions that, when executed by the BMC processing system, cause the BMC processing system to provide a BMC engine that is configured to:
  receive, from the BIOS engine, the PCIe device error information collection instruction and, in response, retrieve PCIe device error information from the PCIe device while the operating system performs the at least one workload; and
  store the PCIe device error information.

8. The IHS of claim 7, wherein the PCIe device error information retrieved by the BMC engine includes a first subset of PCIe device error information that is included in at least one register in the PCIe device, and wherein the BIOS engine is configured to:
  retrieve, in response to identifying the error in the PCIe device, a second subset of the PCIe device error information that is included in at least one register in the PCIe device and that is different than the first subset of the PCIe device error information; and
  store the second subset of the PCIe device error information.

9. The IHS of claim 8, wherein the first subset of the PCIe device error information includes Base Address Register (BAR) information, command (CMD) register information, and status register information.

10. The IHS of claim 7, wherein the BMC engine is configured to:
  identify, in response to receiving the PCIe device error information collection instruction, at least one port that is connected to the PCIe device; and
  store a port identifier for each of the at least one port.

11. The IHS of claim 7, wherein the BMC engine is configured to:
  identify, in response to receiving the PCIe device error information collection instruction, at least one bridge device that is connected to the PCIe device; and
  store a bridge device identifier for each of the at least one bridge device.

12. The IHS of claim 7, wherein the PCIe device is a Non-Volatile Memory express (NVMe) storage device and the PCIe device error information is retrieved from a queue included in the NVMe storage device.

13. The IHS of claim 7, wherein the BMC engine is configured to:
  perform error causation analysis operations using the PCIe device error information to determine at least one cause of the error identified in the PCIe device; and
  provide the at least one cause of the error identified in the PCIe device for display on a display device.

14. A method for handling errors in a Peripheral Component Interconnect express (PCIe) device, comprising:
  identifying, by a Basic Input/Output System (BIOS) subsystem, an error in a Peripheral Component Interconnect express (PCIe) device that is coupled to the BIOS subsystem and, in response, beginning a System Management Mode (SMM) that suspends the performance of at least one workload in an operating system;
  generating and transmitting, by the BIOS subsystem, a PCIe device error information collection instruction associated with the PCIe device;
  ending, by the BIOS subsystem subsequent to transmitting the PCIe device error information collection instruction, the SMM such that the performance of at least one workload is resumed in the operating system;
  receiving, by a Baseboard Management Controller (BMC) device from the BIOS subsystem, the PCIe device error information collection instruction and, in response, retrieving PCIe device error information from the PCIe device while the operating system performs the at least one workload; and
  storing, by the BMC device, the PCIe device error information.

15. The method of claim 14, wherein the PCIe device error information retrieved by the BMC subsystem includes a first subset of PCIe device error information that is included in at least one register in the PCIe device, and wherein the method includes:
  retrieving, by the BIOS subsystem in response to identifying the error in the PCIe device, a second subset of the PCIe device error information that is included in at least one register in the PCIe device and that is different than the first subset of the PCIe device error information; and
  storing, by the BIOS subsystem, the second subset of the PCIe device error information.

16. The method of claim 15, wherein the first subset of the PCIe device error information includes Base Address Register (BAR) information, command (CMD) register information, and status register information.

17. The method of claim 14, further comprising:
  identifying, by the BMC device in response to receiving the PCIe device error information collection instruction, at least one port that is connected to the PCIe device; and
  storing, by the BMC device, a port identifier for each of the at least one port.

18. The method of claim 14, further comprising:
  identifying, by the BMC device in response to receiving the PCIe device error information collection instruction, at least one bridge device that is connected to the PCIe device; and
  storing, by the BMC device, a bridge device identifier for each of the at least one bridge device.

19. The method of claim 14, wherein the PCIe device is a Non-Volatile Memory express (NVMe) storage device and the PCIe device error information is retrieved from a queue included in the NVMe storage device.

20. The method of claim 14, further comprising:
performing, by the BMC device, error causation analysis operations using the PCIe device error information to determine at least one cause of the error identified in the PCIe device; and
providing, by the BMC device, the at least one cause of the error identified in the PCIe device for display on a display device.

* * * * *